(12) United States Patent
Tsutsumi (10) Patent No.: US 10,198,222 B2
(45) Date of Patent: Feb. 5, 2019

(54) INFORMATION DISPLAY SYSTEM (71) Applicant: KYOCERA Document Solutions Inc., Osaka-shi, Osaka (JP)

(72) Inventor: Masafumi Tsutsumi, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 0 days.

(21) Appl. No.: 15/496,007

(22) Filed: Apr. 25, 2017

(65) Prior Publication Data
US 2017/0315758 A1  Nov. 2, 2017

(30) Foreign Application Priority Data

Apr. 28, 2016 (JP) ................. 2016-091728

(51) Int. Cl.
*G06F 3/12* (2006.01)
*H04N 1/00* (2006.01)

(52) U.S. Cl.
CPC .......... *G06F 3/1204* (2013.01); *G06F 3/129* (2013.01); *H04N 1/00129* (2013.01)

(58) Field of Classification Search
CPC ............... G06F 3/1204; G06F 3/129
See application file for complete search history.

(56) References Cited

U.S. PATENT DOCUMENTS

| 6,300,947 | B1 | 10/2001 | Kanevsky |
| 9,723,177 | B2* | 8/2017 | Ozawa .................. H04N 1/465 |
| 9,958,935 | B2* | 5/2018 | Scheer .................. G06F 3/0488 |
| 2015/0268548 | A1* | 9/2015 | Park ....................... G03B 21/28 |
| | | | 353/30 |

FOREIGN PATENT DOCUMENTS

JP  2000-066868 A  3/2000

* cited by examiner

*Primary Examiner* — Ibrahim Siddo
(74) *Attorney, Agent, or Firm* — Viering, Jentschura & Partner mbB (57) ABSTRACT

The information display system includes a printing apparatus and a display terminal. The display terminal's control unit includes a visual recognition determination unit, an image-data extraction unit, a link status determination unit, a link destination information acquisition unit, and a display control unit. The link status determination unit determines whether a page of printed matter visually recognized by a user through lenses contains a representation associated with link destination information. If the link status determination unit determines the presence of the representation associated with the link destination information, the link destination information acquisition unit acquires the link destination information based on the image data extracted by the image-data extraction unit. The display control unit performs control operations to display on the lenses the link destination information acquired by the link destination information acquisition unit so that the user can visually recognize the link destination information.

14 Claims, 11 Drawing Sheets

MATHEMATICS
LANGUAGE

TABLE 3-1 REPORT CARD

|   | A | B | C |
|---|---|---|---|
|   | 70 | 65 | 60 |
|   | 60 | 85 | 70 |
|   | 70 | 85 | 90 |
|   | 90 | 70 | 80 |

SCIENCE
SOCIAL STUDY — 41 —

47
71  48  73  46

INFORMATION DISPLAY SYSTEM

INCORPORATION BY REFERENCE

The disclosure of Japanese Patent Application No. 2016-091728 filed on Apr. 28, 2016 including the specification, drawings and abstract is incorporated herein by reference in its entirety.

BACKGROUND

The present disclosure relates to an information display system.

A printing apparatus, typified by a multifunction peripheral, emits light to a photoreceptor in a printing unit based on image data to form an electrostatic latent image on the photoreceptor. Then, the printing apparatus applies charged toner onto the formed electrostatic latent image to make it into a visible image that is in turn transferred onto a sheet of paper. The toner is fixed on the paper by a fuser built in the printing apparatus. The paper with the fixed toner is discharged as printed matter from the apparatus.

The printing apparatus receives image data from a computer connected thereto via a network, or obtains image data read by an image reading unit. The contents of printed matter may vary, but some may contain a table or a diagram, and also may contain information, like "See Table 1", linked to the table or diagram. In order to obtain information about the table or diagram at the link destination, unless the link source and the link destination are present in the same page of printed matter, the user has to turn the pages of the printed matter until reaching the link destination page to find out the table or diagram at the link destination, and visually check it. Regarding the display of the information, the technology for apparatuses capable of displaying web pages accessed via the Internet is known.

A typical computer-based apparatus automatically adapts a viewable information signal received from a wide area network server for display on a display screen associated with a user computer system. The computer-based apparatus includes means for transmitting a user request signal from the user computer system to the network server, the user request signal containing information relating to at least one display screen-related attribute associated with the user's display screen and information specific to the user's request, means for generating the viewable information signal in response to the information specific to the user's request, and means for adapting the viewable information signal in response to at least one display screen-related attribute to conform the information associated therewith to the user's display screen when viewed.

SUMMARY

The information display system according to the present disclosure displays link destination information contained in printed matter produced based on image data. The information display system includes a printing apparatus and a display terminal. The printing apparatus forms an image for printing. The display terminal is capable of communicating with the printing apparatus and displays information. The printing apparatus includes a printing unit and an image-data transmission control unit. The printing unit forms an image based on acquired image data for printing. The image-data transmission control unit performs control operations to transmit image data obtained during the printing by the printing unit to the display terminal. The display terminal includes a receiving unit, a storage unit, a display unit, a visual recognition determination unit, an image-data extraction unit, a link status determination unit, a link destination information acquisition unit, and a display control unit. The receiving unit receives the image data transmitted by the image-data transmission control unit. The storage unit stores the image data received by the receiving unit. The display unit displays information. The visual recognition determination unit determines whether the user visually recognizes the printed matter produced by the printing unit through the display unit. If the visual recognition determination unit determines that the user visually recognizes the printed matter, the image-data extraction unit extracts image data that is stored in the storage unit and is associated with the printed matter. The link status determination unit determines whether the printed matter visually recognized by the user through the display unit contains a representation associated with link destination information. If the link status determination unit determines the presence of the representation associated with the link destination information, the link destination information acquisition unit acquires the link destination information based on the image data extracted by the image-data extraction unit. The display control unit performs control operations to display on the display unit the link destination information acquired by the link destination information acquisition unit so that the user can visually recognize the link destination information.

DETAILED DESCRIPTION

Figure 1:
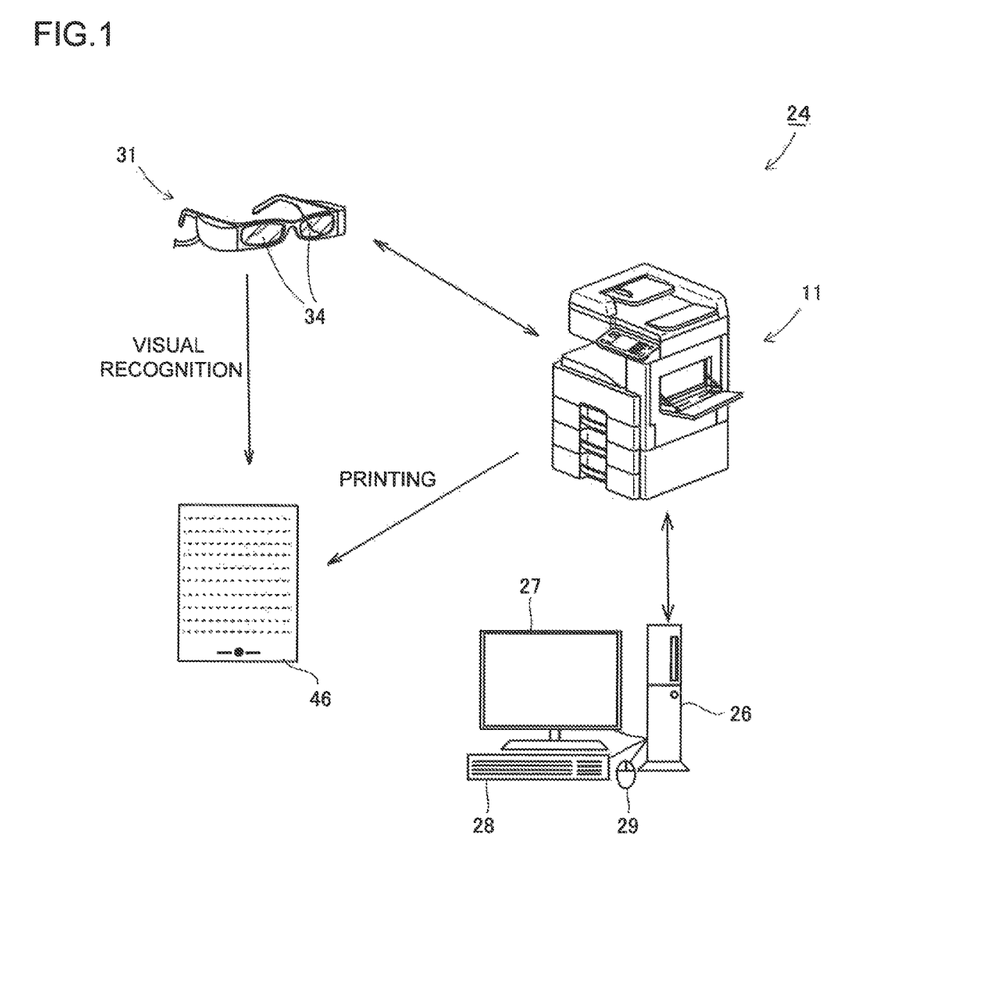
FIG. 1 is a schematic external view of an information display system according to an embodiment of the present disclosure.
Figure 2:
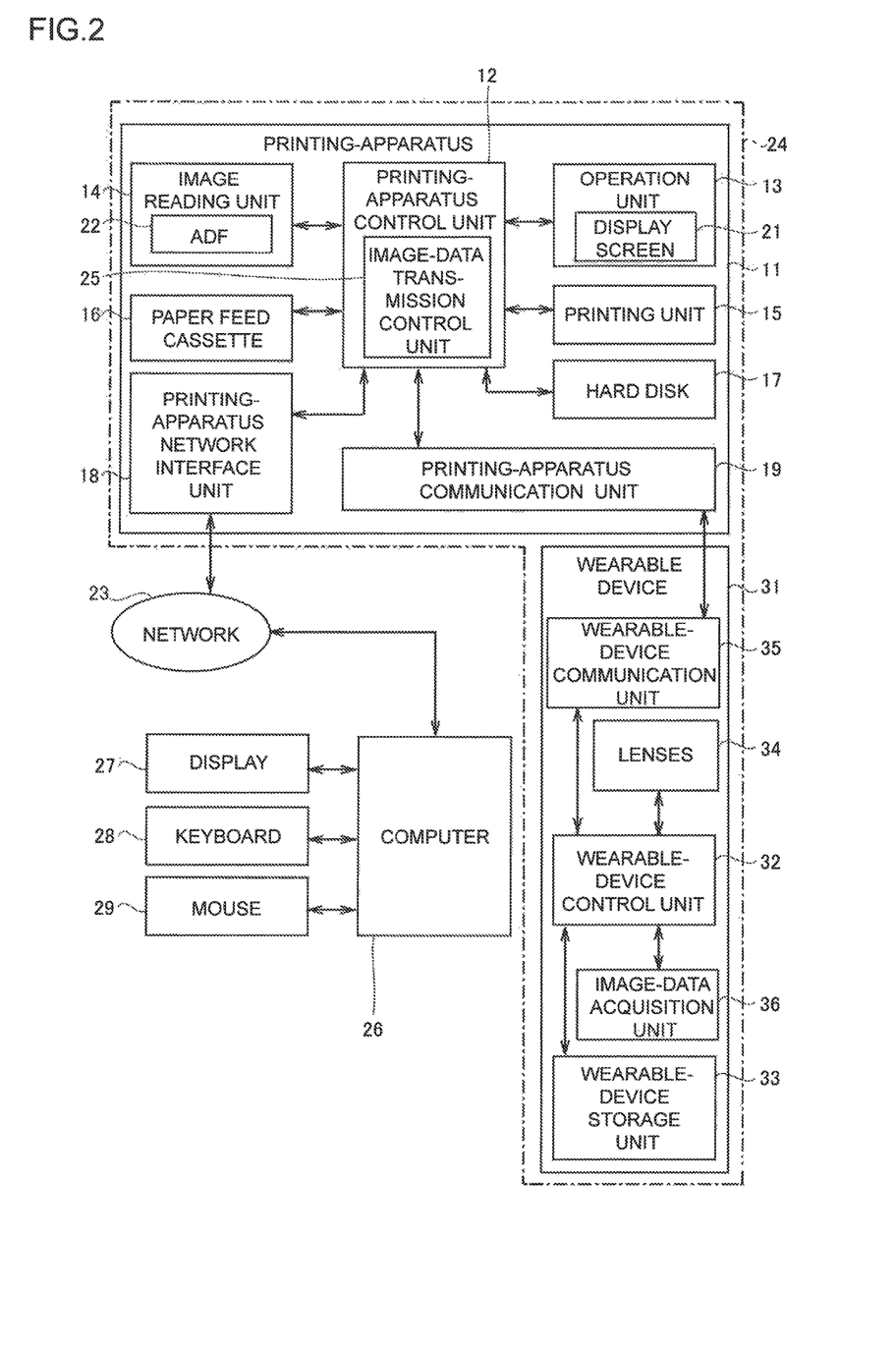
FIG. 2 is a block diagram showing the configuration of the information display system shown in FIG. 1.

An embodiment of the present disclosure will be described below. FIG. 1 is a schematic external view of an information display system 24 according to the embodiment of the disclosure. FIG. 2 is a block diagram showing the configuration of the information display system 24 shown in FIG. 1. In FIG. 2, the information display system 24 is indicated with a dot-and-dash line.

Referring to FIGS. 1 and 2, the information display system 24 displays link destination information contained in printed matter 46 produced based on image data. The information display system 24 includes a printing apparatus 11 that forms an image and prints it out, and a wearable device 31 serving as a display terminal. FIG. 1 also shows a computer 26 that transmits image data and print instructions to the printing apparatus 11 included in the information display system 24.

Firstly, the configuration of the printing apparatus 11 will be described. The printing apparatus 11 has a plurality of functions relating to image processing, such as a copying function, a printer function, and a facsimile function. The printing apparatus 11 includes a printing-apparatus control unit 12, an operation unit 13, an image reading unit 14, a printing unit 15 that forms an image on paper to print it out, paper feed cassettes 16, a hard disk 17, a printing-apparatus network interface unit 18 used to connect to a network 23, and a printing-apparatus communication unit 19 serving as a receiving unit.

The printing-apparatus control unit 12 controls the entire printing apparatus 11. The operation unit 13 includes a display screen 21 that displays information submitted from the printing apparatus 11 and entries made by the user. The display screen 21 is a touch panel type screen that displays information about the printing apparatus 11 and also serves as an input interface. The operation unit 13 allows the users to input image forming conditions, such as the number of copies and gradation degrees, and to turn on or off the power source. The image reading unit 14 includes an auto document feeder (ADF) 22 serving as a document transporting device that transports an original document placed on a loading position to a reading position. The image reading unit 14 reads image data from original documents loaded in an ADF 22 or placed on a document table (not shown). The printing apparatus 11 includes a plurality of paper feed cassettes 16 each capable of holding a plurality of sheets of paper. The printing unit 15 forms an image on paper transported from the paper feed cassettes 16, based on image data read by the image reading unit 14 or image data transmitted via the network 23. The hard disk 17 stores the transmitted image data, the input image forming conditions, and so on. The printing-apparatus communication unit 19 is an interface to connect to an external device, or more specifically, the wearable device 31.

The printing apparatus 11 operates as a copier by enabling the printing unit 15 to form an image based on image data of a document read by the image reading unit 14. In addition, the printing apparatus 11 operates as a printer by enabling the printing unit 15 to form an image to print it out, using image data transmitted from the computer 26 or other devices connected to the network 23.

The printing-apparatus control unit 12 includes an image-data transmission control unit 25. The image-data transmission control unit 25 performs control operations to send the image data obtained during the printing operation by the printing unit 15 to the wearable device 31. When printing is performed, the image-data transmission control unit 25 establishes connection with the wearable device 31 to transmit the image data to the wearable device 31. The operations made by the image-data transmission control unit 25 will be described later.

Secondly, the configuration of the wearable device 31 will be described. The wearable device 31 is capable of communicating with the printing apparatus 11. The communication is made utilizing, for example, Wi-Fi. The wearable device 31 is a so-called glasses-type wearable device 31. The wearable device 31 is mounted on the user's head and captures the information within the field of view of the user.

The wearable device 31 includes a wearable-device control unit 32, a wearable-device storage unit 33, a pair of lenses 34 serving as a display unit for displaying information, a wearable-device communication unit 35, and an image-data acquisition unit 36. The wearable-device control unit 32 controls the entire wearable device 31. The wearable-device storage unit 33 serving as a storage unit may be a nonvolatile semiconductor memory or other types of memory, and stores image data and other various types of data. The lenses 34 are transparent lenses. The user who wears the wearable device 31 can see various things through the lenses 34, for example, the printed matter produced by the printing apparatus 11, and can browse it. The lenses 34 can project and display various types of data of information in a visually recognizable form by means of a display control unit 42, which will be described later. The wearable-device communication unit 35, serving as a receiving unit, receives image data transmitted from the printing apparatus 11. The image-data acquisition unit 36 acquires image data of an image of the printed matter from the information within the field of view of the user. Specifically, the image-data acquisition unit 36 captures information of the view seen by the user through the lenses 34 of the wearable device 31, using an image pickup camera (not shown) or the like built in the wearable device 31, and processes the information into image data.

Figure 3:
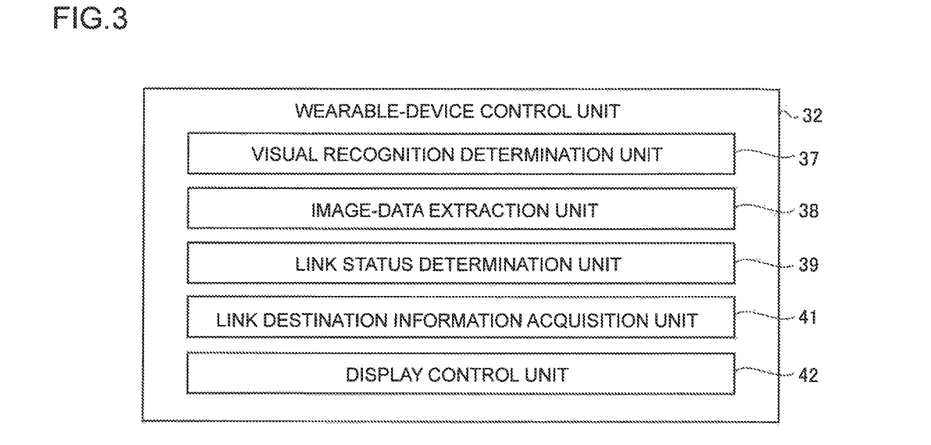
FIG. 3 is a block diagram showing the configuration of a wearable-device control unit.

Next, the configuration of the wearable-device control unit 32 will be described. FIG. 3 is a block diagram showing the configuration of the wearable-device control unit 32. Referring to FIG. 3, the wearable-device control unit 32 includes a visual recognition determination unit 37, an image-data extraction unit 38, a link status determination unit 39, a link destination information acquisition unit 41, and the display control unit 42. The visual recognition determination unit 37 determines whether the user visually recognizes the printed matter produced by the printing unit 15 through the lenses 34. If the visual recognition determination unit 37 determines that the user visually recognizes the printed matter, the image-data extraction unit 38 extracts image data that is stored in the wearable-device storage unit 33 and is associated with the printed matter. The link status determination unit 39 determines whether the printed matter visually recognized by the user through the lenses 34 contains a representation associated with link destination information. If the link status determination unit 39 determines that the printed matter contains a representation associated with link destination information, the link destination information acquisition unit 41 acquires the link destination information based on the image data extracted by the image-data extraction unit 38. The display control unit 42 performs control operations to display on the lenses 34 the link destination information acquired by the link destination information acquisition unit 41 so that the user can visually recognize the link destination information. The configuration of the components will be described later in detail.

Next, the configuration of the computer 26 connectable to the printing apparatus 11 via the network 23 will be described. A display 27, a keyboard 28, and a mouse 29 are connected to the computer 26. The display 27 displays information and data from the computer 26. The user inputs data to the computer 26 using the keyboard 28 and mouse 29. To make a print request to the printing apparatus 11, the user uses the keyboard 28 and mouse 29 connected to the computer 26 to transmit a print instruction with image data to be printed to the printing apparatus 11 through the network 23. The printing apparatus 11 forms an image on paper based on the received image data, prints it out, and outputs it according to the received print instruction.

Next, the flow of a process for displaying link destination information contained in printed matter using the information display system 24 will be described. This description presents a case where printed matter containing link destination information is printed.

Figure 4:
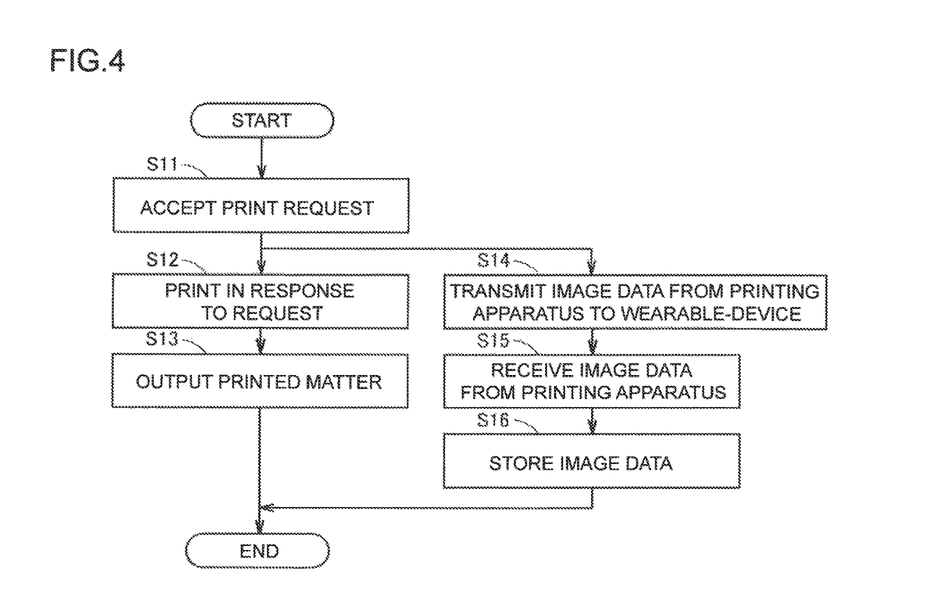
FIG. 4 is a flowchart of the process of producing printed matter containing link destination information.

FIG. 4 is a flow chart of the process for producing printed matter containing link destination information. Referring to FIG. 4, the user makes a print request to the printing apparatus 11 using the computer 26. Specifically, the user transmits a print instruction with image data to be printed to the printing apparatus 11 via the network 23. Then, the printing apparatus 11 accepts the print request (step S11 in FIG. 4, hereinafter "step" is omitted). In this step, the printing apparatus 11 receives the image data through the printing-apparatus network interface unit 18.

After the reception of the image data, the printing unit 15 forms an image based on the received image data, and prints it (S12). Thus, the printing apparatus 11 outputs printed matter (S13). At this moment in time, or when the printing operation is performed, the image data is transmitted from the printing apparatus 11 to the wearable device 31 (S14). Specifically, the printing-apparatus communication unit 19 transmits the image data to the wearable-device communication unit 35. The wearable device 31 receives the image data transmitted from the printing apparatus 11 (S15). Subsequently, the received image data is stored in the wearable-device storage unit 33 (S16). Thus, the image data having been subjected to printing operation by the printing unit 15 is stored in the wearable-device storage unit 33.

Figure 5:
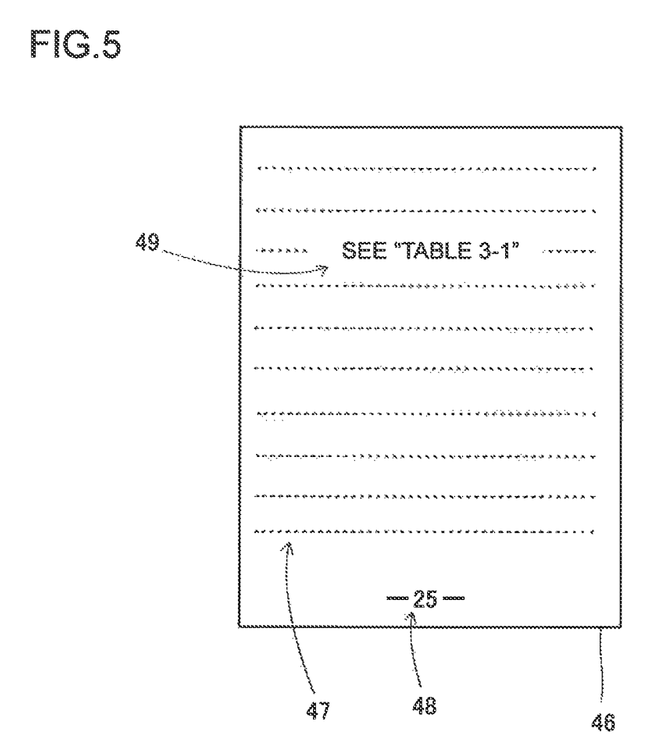
FIG. 5 shows a part of the printed matter.

FIG. 5 shows a part of the printed matter 46. "A part" described herein denotes one of a plurality of sheets of the printed matter 46. Referring to FIG. 5, the printed matter 46 includes a plurality of sheets, that is, a plurality of pages. A page of the printed matter 46 has a textual representation 47 at a center area thereof, and a numeral representation 48 at a lower part thereof. The textual representation 47 contains a plurality of horizontal lines composed of characters, and the numeral representation 48 indicates the page number as a footer. The printed matter 46 shown in FIG. 5 corresponds to page 25 of the printed matter 46. In addition, this page has a textual representation 49 composed of characters "See 'Table 3-1'." in a middle part of the textual representation 47. This representation 49 is associated with link destination information, and suggests the presence of a table not on page 25, but on another page.

Next, the flow of a process for displaying link destination information contained in the printed matter 46 will be described. This description offers the flow of a process for displaying link destination information, which is contained in the printed matter 46 produced in the flow of the process shown in FIG. 4.

Figure 6:
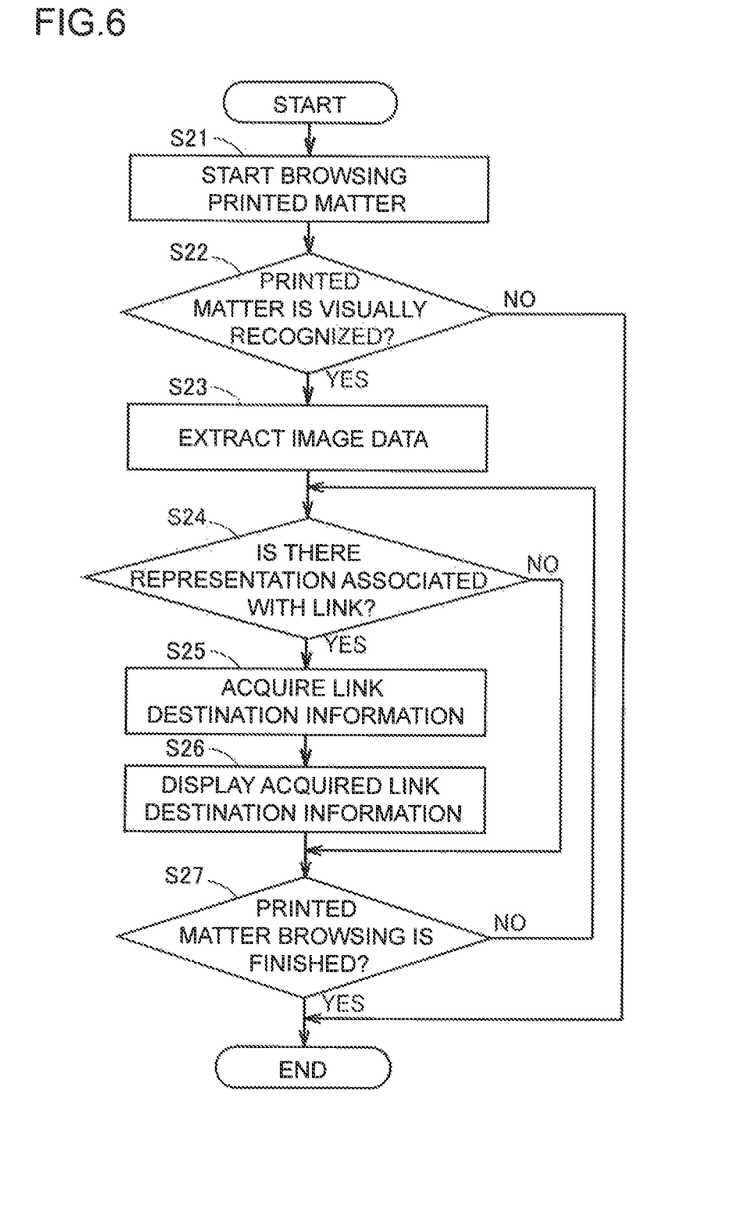
FIG. 6 is a flowchart of the process of displaying the link destination information.

FIG. 6 is a flowchart of a process for displaying link destination information contained in the printed matter 46. Referring to FIG. 6, the user firstly starts browsing the printed matter 46 (S21). In this step, the user mounts the wearable device 31 on his/her head, and browses the printed matter 46 through the lenses 34.

At this point, the visual recognition determination unit 37 determines whether the user visually recognizes the printed matter produced by the printing unit 15 through the lenses 34. Specifically, the visual recognition determination unit 37 determines whether the image data of the printed matter 46 acquired by the image-data acquisition unit 36 is stored in the wearable-device storage unit 33. The determination depends on information about whether the same characters are written on the same numbered page, or on information about the layout of character strings, tables, and diagrams contained in the printed matter 46.

If the visual recognition determination unit 37 determines that the user visually recognizes the printed matter 46 (Yes in S22), the image-data extraction unit 38 extracts the image data that is stored in the wearable-device storage unit 33 and is associated with the printed matter 46 (S23).

Subsequently, the link status determination unit 39 determines whether the printed matter 46 visually recognized by the user through the lenses 34 contains a representation associated with link destination information. Specifically, the link status determination unit 39 makes determination based on the presence or absence of the characters "See", URL, or other clues in the printed matter 46 visually recognized by the user through the lenses 34. Since the printed matter 46 shown in FIG. 5 contains the textual representation 49 composed of the characters "See 'Table 3-1'.", the link status determination unit 39 determines that the printed matter 46 contains a representation associated with link destination information (YES in S24).

If the link status determination unit 39 determines the presence of a representation 49 associated with link destination information, the link destination information acquisition unit 41 acquires the link destination information based on the image data extracted by the image-data extraction unit 38 (S25). The link destination information herein is, for example, information about the page number at the link destination, or information about data of the linked table or diagram.

Then, the display control unit 42 performs control operations to display on the lenses 34 the link destination information acquired by the link destination information acquisition unit 41 so that the user can visually recognize the information (S26). In this step, the display control unit 42 displays the link destination information on the lenses 34 while maintaining the printed matter 46 visually recognizable to the user.

Figure 7:
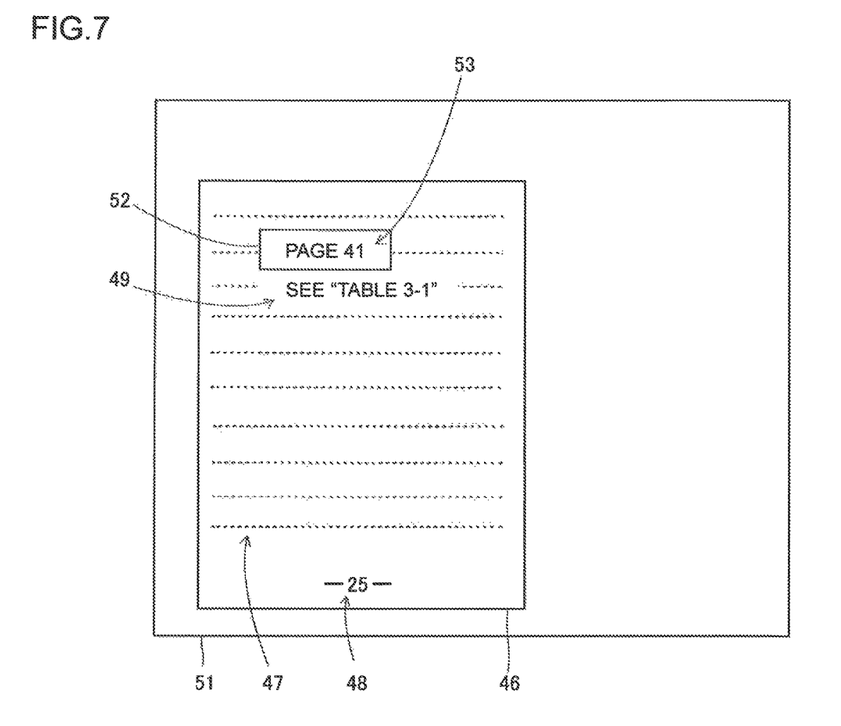
FIG. 7 shows an example of a viewable image through the lenses. The viewable image contains the page number of a page at a link destination, the page number being the link destination information.

FIG. 7 shows an example of a viewable image through the lenses 34. The viewable image indicates the page number at the link destination, which is the link destination information. Referring to FIG. 7, the printed matter 46 including the representations 47, 48, 49 is displayed within a viewable image 51. A text box 52 indicating the link destination information is displayed in the vicinity of the textual representation 49 indicating the link destination, more specifically, in an upper area with respect to the representation 49. Specifically, the link destination information herein is an indication 53 of "page 41" that is the page number at the link destination. This indication 53 is not actually printed on the printed matter 46, but is projected by the display control unit 42 onto the lenses 34. In other words, the indication 53 can be visually recognized in the viewable image 51 by the user wearing the wearable device 31, but cannot be recognized by other users. Of course, the printed matter 46 is not stained.

The display control unit 42 performs such display operations, and the process is completed when the user finishes browsing the printer matter 46 (Yes in S27).

The information display system 24 allows the user to check the link destination information shown on the lenses 34. Thus, the user does not need to take the time and effort, for example, turning the pages of the printed matter 46, to find the link destination information. This can increase user convenience in browsing printed matter 46.

The display control unit 42 is configured to display information about the page number at the link destination, which is acquired by the link destination information acquisition unit 41. This configuration allows the user to readily recognize the information about the page number at the link destination. Thus, the user can skip pages and readily find the location of the link destination.

The text box 52 indicating the link destination information can be displayed in a lower area, in a right area, or in a left area with respect to the representation 49.

Although, in the above embodiment, the display control unit 42 is configured to display the information about the page number at the link destination in the text box 52 located in an upper area with respect to the representation 49, the embodiment is not limited thereto, and the display control unit 42 can be configured to display the information about the page number at the link destination in the form of a figure visually representing the relationship between the page number of the current page the user is visually recognizing and the page number at the link destination.

Figure 8:
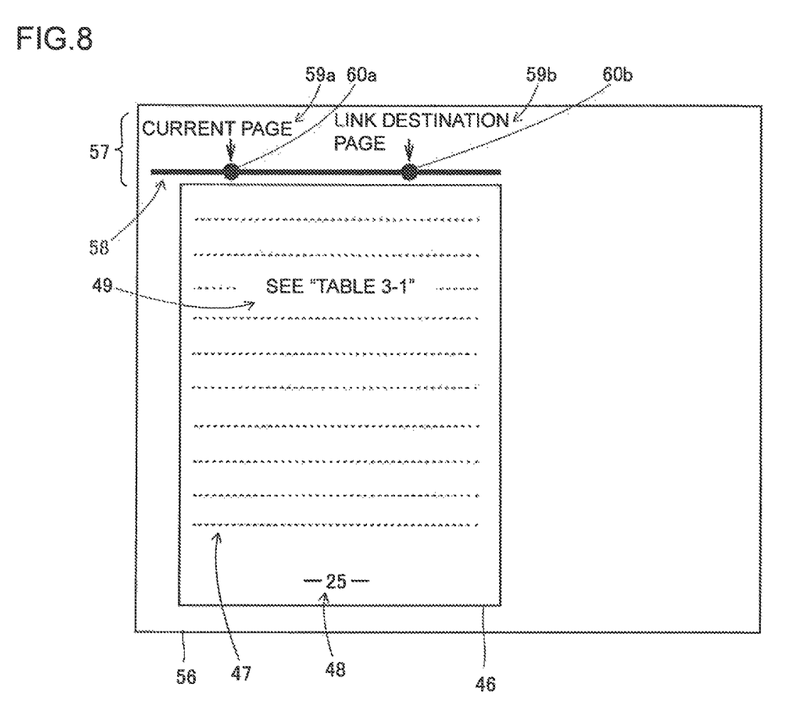
FIG. 8 is an example of the viewable image through the lenses. The viewable image is displayed by the display control unit in another display style.

FIG. 8 is an example of the viewable image through the lenses 34. The viewable image is displayed by the display control unit 42 in another display style. Referring to FIG. 8, a viewable image 56 includes a link-destination indicating bar 58 in an upper area 57 with respect to the printed matter 46 with the representations 47, 48, 49 printed thereon. The link-destination indicating bar 58 is a thick lateral bar with a dot 59*a* indicating the page number of the current page and a dot 59*b* indicating the page number at the link destination. The dot 59*a* represents the location of the "current page" with an indication 60*a* of "current page" indicated by an arrow. The dot 59*a* represents the location of the "link destination page" with an indication 60*b* of "link destination page" indicated by an arrow.

The bar and dots facilitate visual checking of the positional relationship between the current page and the page at the link destination. Since there is no link destination information over the textual representation 47 in the printed matter 46, the visibility of the printed matter 46 itself can be increased.

The link destination information may be displayed as described below. The display control unit 42 displays information about the page number at the link destination in the form of figures of a book opened with the current page facing up, and a bookmark indicating the page at the link destination.

Figure 9:
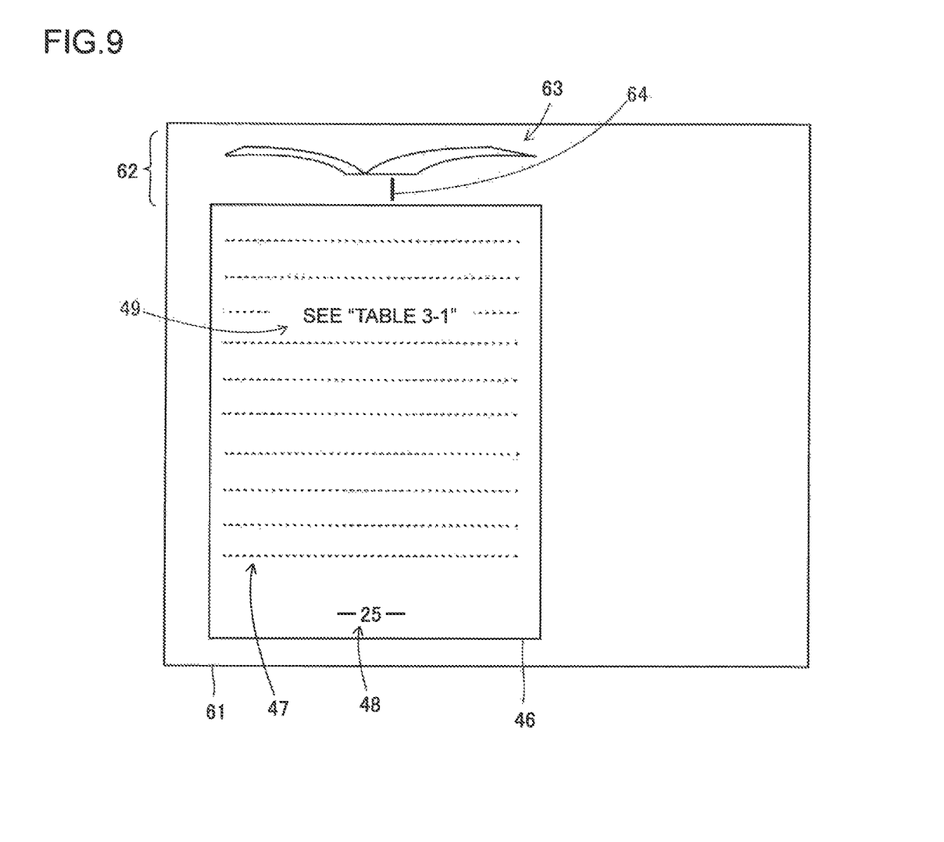
FIG. 9 is an example of the viewable image through the lenses. The viewable image is displayed by the display control unit in yet another display style.

FIG. 9 is an example of the viewable image through the lenses 34. The viewable image is displayed by the display control unit 42 in yet another display style. Referring to FIG. 9, a viewable image 61 includes a book figure 63 in an upper area 62 with respect to the printed matter 46 with the representations 47, 48, 49 printed thereon, and the book figure 63 indicates information about the page number at the link destination. The book figure 63 is in the shape of an open book, and visually represents where the current page is located in the whole printed matter 46. The bookmark figure 64 depicted with a thick line indicates the position of the page at the link destination. The book figure and bookmark figure allow the user to visually check the positional relationship between the current page and the page at the link destination. Since there is no link destination information over the textual representation 47 in the printed matter 46, the visibility of the printed matter 46 itself can be increased.

Although, in the above-described embodiment, the display control unit 42 is configured to display information about the page number at the link destination, which is acquired by the link destination information acquisition unit 41, the embodiment is not limited thereto, and the display control unit 42 can be configured to display the image data at the link destination, which is acquired by the link destination information acquisition unit 41, to the user in a visible style without any changes.

Figure 10:
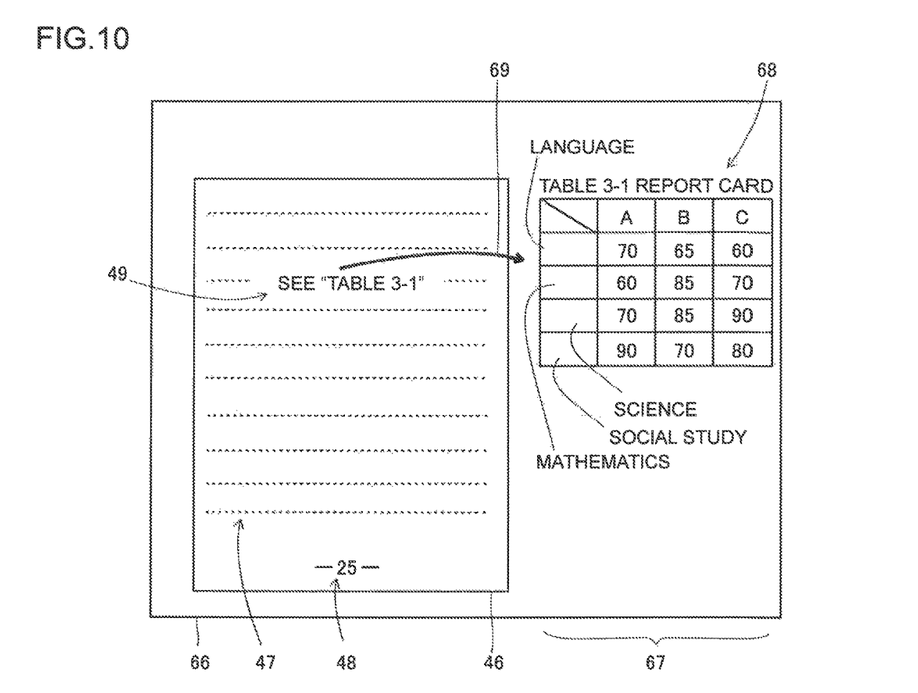
FIG. 10 is an example of the viewable image through the lenses. The viewable image contains linked image data.

FIG. 10 is an example of the viewable image through the lenses 34. The viewable image includes the image data at the link destination. Referring to FIG. 10, a viewable image 66 includes image data 68 at the link destination, in a right area 67 with respect to the printed matter 46 with the representations 47, 48, 49 printed thereon. Specifically, the image data 68 is a table object image data entitled "Table 3-1, Report Card", and containing subjects, such as language, mathematics, science, and social studies, in vertical cells, and the names of the persons to be graded, such as A, B, and C, in horizontal cells, and the scores of the subjects in the corresponding cells. The image data 68 is displayed at the pointing end of an arrow 69 extending from the representation 49.

This configuration allows the user to recognize the image at the link destination as the image data 68, and also allows the user to check detailed information of the linked image without turning the pages. Since there is no link destination information over the textual representation 47 of the printed matter 46, the visibility of the printed matter 46 itself can be increased.

The link destination information may be displayed as described below. The display control unit 42 displays an outline figure of the image at the link destination, acquired by the link destination information acquisition unit 41, at the position corresponding to where the image at the link destination is present so that the user can read the printed matter 46 through the outline figure of the image at the link destination.

Figure 11:
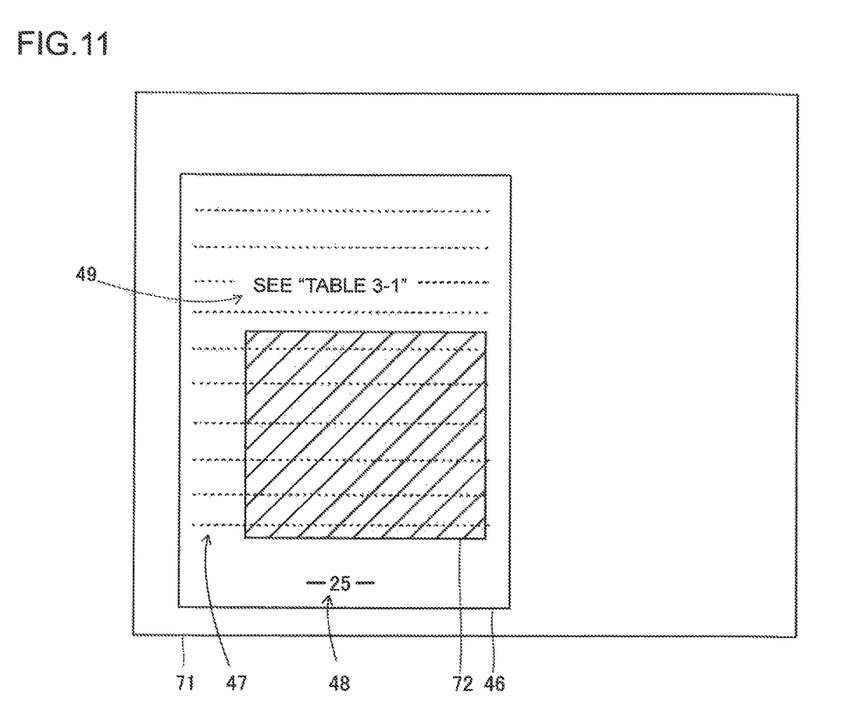
FIG. 11 is an example of the viewable image through the lenses. The viewable image contains the outline shape of the linked image data.
Figure 12:
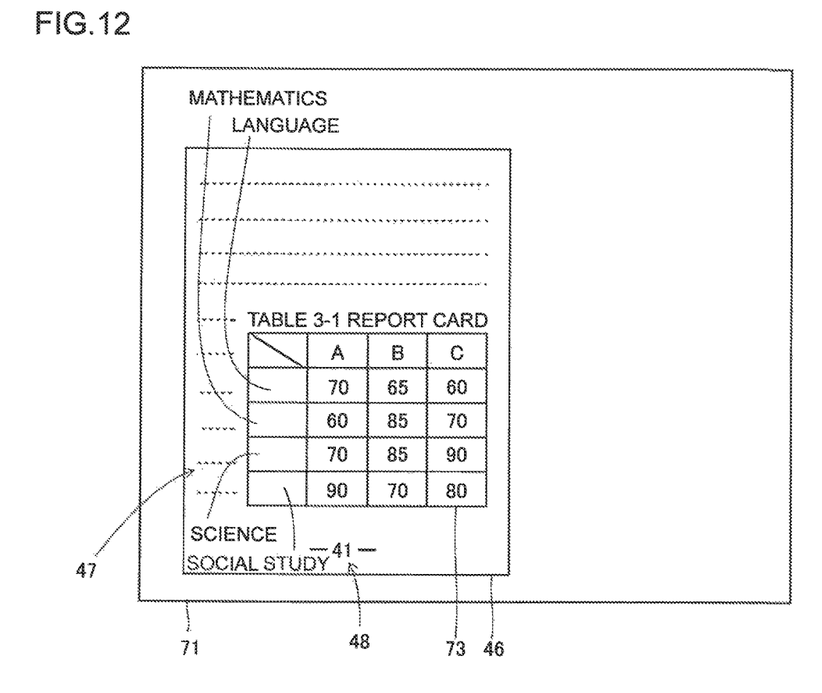
FIG. 12 is an example of the viewable image containing a linked image.

FIG. 11 is an example of the viewable image through the lenses 34. The viewable image includes an outline figure of the linked image data. Referring to FIG. 11, a viewable image 71 includes an outline figure 72 on the printed matter 46 with the representations 47, 48, 49 printed thereon. The outline figure 72 is in the shape of the linked image, and is located at a position corresponding to where the image at the link destination is present. The outline figure 72 is filled in with a hatch pattern to represent its transparency. Therefore, the textual representation 47 can be seen through the outline figure. 72, and therefore the user can visually recognize the textual representation 47. This configuration allows the user to grasp the outer shape of the image data at the link destination. If the user turns the pages and reaches the page on which the linked image is present, the linked image 73 appears as it is as shown in FIG. 12. FIG. 12 shows an example of the viewable image including the linked image 73.

In this case, the display style of the outline figure 72, for example, the color or the color density of the outline figure 72 can be changed between when the page at the link destination is located before the current page and when it is located after the current page. The display style difference provides clear recognition of the positional relationship between the current page and the page at the link destination. Alternatively, the outline figure 72 can be configured to increase the color density every time the user turns a page and the current page approaches the page of the image at the link destination. The outline figure 72 also can be configured to decrease the color density every time the user turns a page and the current page is turned away from the page of the image at the link destination. The density changes allow the user to visually grasp the positional relationship between the current page and the page at the link destination more clearly.

Although, in the above-described embodiment, the link destination information includes information about the page number at the link destination and information about image data at the link destination, the embodiment is not limited thereto, and an information link to another link destination can be the link destination information. For example, if the destination of a link is literature, the information may be image data of that literature's front page or summary, or the information may indicate how many pages are present before or after the current page.

In addition, the above-described embodiment can include a switch unit capable of changing the display control by the display control unit 42. The switch unit is configured to display link destination information in a display style required by the user. Specifically, for example, a switch key for changing the display style of the link destination information is provided on a side of a lens of the wearable device 31. The user presses a switch of the switch key to choose one display style from the aforementioned various display styles.

Although, in the above-described embodiment, the image-data transmission control unit 25 is configured to transmit image data to the wearable device 31 when a printing operation is performed, the embodiment is not limited thereto, and the image-data transmission control unit 25 can be configured to transmit multiple sets of image data obtained through printing operations at once at a predetermined point in time to the wearable device 31.

Although, in the above-described embodiment, the link destination information of the printed matter 46 is displayed using the image data transmitted from the computer 26, the embodiment is not limited thereto, and the embodiment can be used when printed matter obtained by copying an image of an original document is browsed. Specifically, for example, an original document placed on an ADF 22 is scanned by an image reading unit 14, and the obtained image data is transmitted to the wearable device 31. When the printed matter 46 that was scanned by the image reading unit and printed out is browsed, the link destination information can be displayed.

Although, in the above-described embodiment, the wearable device 31 is used as a display terminal, the embodiment is not limited thereto, and the display terminal may be, for example, a tablet PC, a mobile terminal having a touch panel serving as a display unit, or may be a display terminal having a projection-type display unit, such as a projector.

It should be understood that the embodiment disclosed herein is illustrative and non-restrictive in every respect. The scope of the present disclosure is defined by the terms of the claims, rather than by the foregoing description, and is intended to include any modifications within the scope and meaning equivalent to the terms of the claims.

The information display system according to the present disclosure can be effectively used especially to meet a demand for improving user convenience in browsing printed matter.

What is claimed is:

1. An information display system displaying link destination information contained in printed matter produced based on image data, the system comprising:
    a printing apparatus forming an image for printing, and
    a display terminal capable of communicating with the printing apparatus, and displaying information,
    wherein the printing apparatus including:
        a printing unit forming an image based on acquired image data for printing; and
        an image-data transmission control unit transmitting the image data obtained during printing operation by the printing unit to the display terminal, and
    wherein the display terminal including:
        a receiving unit receiving the image data transmitted from the image-data transmission control unit;
        a storage unit storing the image data received by the receiving unit;
        a display unit displaying the information;
        a visual recognition determination unit determining whether or not a user visually recognizes the printed matter, which is produced by the printing unit, through the display unit;
        an image-data extraction unit, if the visual recognition determination unit determines that the user visually recognizes the printed matter, extracting the image data that is stored in the storage unit and is associated with the printed matter;
        a link status determination unit determining whether or not a page of the printed matter, which is visually recognized by the user through the display unit, contains a representation associated with link destination information;
        a link destination information acquisition unit, if the link status determination unit determines the presence of the representation associated with the link destination information, acquiring the link destination information based on the image data extracted by the image-data extraction unit; and
        a display control unit performing control operations to display on the display unit the link destination information acquired by the link destination information acquisition unit so that the user can visually recognize the link destination information,
        wherein
            the display control unit performs control operations to display information about a page number at a link destination, the information being the link destination information acquired by the link destination information acquisition unit and
            the display control unit performs control operations to display the information about the page number at the link destination with a figure visually representing the positional relationship between the page number of a current page visually recognized by the user and the page at the link destination.

2. The image forming system according to claim 1, wherein
    the display control unit performs control operations to display the information about the page number at the link destination in the vicinity of the representation associated with the link destination information.

3. The image forming system according to claim 1, wherein
    the display control unit performs control operations to display image data at the link destination acquired by the link destination information acquisition unit in a visually recognizable manner to the user.

4. The image forming system according to claim 1, wherein
    the display control unit performs control operations to display an outline figure of an image at the link destination, acquired by the link destination information acquisition unit, at the position corresponding to where the image at the link destination is present so that the user can read the printed matter.

5. The image forming system according to claim 4, wherein
the display control unit performs control operations to display the outline figure whose color density changes according to the difference in number between the page of the image at the link destination and the current page.

6. The image forming system according to claim 1, wherein
the display terminal includes a glasses-type wearable device mounted on the user's head, and
the display unit includes lenses included in the glasses-type wearable device.

7. The image forming system according to claim 1, comprising
a switch unit capable of changing the display control performed by the display control unit.

8. An information display system displaying link destination information contained in printed matter produced based on image data, the system comprising:
a printing apparatus forming an image for printing, and
a display terminal capable of communicating with the printing apparatus, and displaying information,
wherein the printing apparatus including:
a printing unit forming an image based on acquired image data for printing; and
an image-data transmission control unit transmitting the image data obtained during printing operation by the printing unit to the display terminal, and
wherein the display terminal including:
a receiving unit receiving the image data transmitted from the image-data transmission control unit;
a storage unit storing the image data received by the receiving unit;
a display unit displaying the information;
a visual recognition determination unit determining whether or not a user visually recognizes the printed matter, which is produced by the printing unit, through the display unit;
an image-data extraction unit, if the visual recognition determination unit determines that the user visually recognizes the printed matter, extracting the image data that is stored in the storage unit and is associated with the printed matter;
a link status determination unit determining whether or not a page of the printed matter, which is visually recognized by the user through the display unit, contains a representation associated with link destination information;
a link destination information acquisition unit, if the link status determination unit determines the presence of the representation associated with the link destination information, acquiring the link destination information based on the image data extracted by the image-data extraction unit; and
a display control unit performing control operations to display on the display unit the link destination information acquired by the link destination information acquisition unit so that the user can visually recognize the link destination information,
wherein
the display control unit performs control operations to display information about a page number at a link destination, the information being the link destination information acquired by the link destination information acquisition unit and
the display control unit performs control operations to display the information about the page number at the link destination with a book figure opened with a current page facing up and a bookmark figure indicating the page at the link destination.

9. The image forming system according to claim 8, wherein
the display control unit performs control operations to display the information about the page number at the link destination in the vicinity of the representation associated with the link destination information.

10. The image forming system according to claim 8, wherein
the display control unit performs control operations to display image data at the link destination acquired by the link destination information acquisition unit in a visually recognizable manner to the user.

11. The image forming system according to claim 8, wherein
the display control unit performs control operations to display an outline figure of an image at the link destination, acquired by the link destination information acquisition unit, at the position corresponding to where the image at the link destination is present so that the user can read the printed matter.

12. The image forming system according to claim 11, wherein
the display control unit performs control operations to display the outline figure whose color density changes according to the difference in number between the page of the image at the link destination and the current page.

13. The image forming system according to claim 8, wherein
the display terminal includes a glasses-type wearable device mounted on the user's head, and
the display unit includes lenses included in the glasses-type wearable device.

14. The image forming system according to claim 8, comprising
a switch unit capable of changing the display control performed by the display control unit.

* * * * *